United States Patent [19]

Cleary et al.

[11] Patent Number: 5,518,060
[45] Date of Patent: May 21, 1996

[54] METHOD OF PRODUCING POLYMERIC PATTERNS FOR USE IN EVAPORABLE FOAM CASTING

[75] Inventors: Terrance M. Cleary, Allenton; Thomas E. Bilderback, Berlin, both of Wis.

[73] Assignee: Brunswick Corporation, Lake Forest, Ill.

[21] Appl. No.: 186,684

[22] Filed: Jan. 25, 1994

[51] Int. Cl.$^6$ ............... B22C 7/00; B22C 9/02; B22D 23/00

[52] U.S. Cl. .................. 164/45; 164/34; 164/46

[58] Field of Search .................. 164/45, 34, 35, 164/36, 46, 6

[56] References Cited

U.S. PATENT DOCUMENTS

| | | | |
|---|---|---|---|
| 4,726,412 | 2/1988 | Magnan et al. | 164/46 |
| 4,844,144 | 7/1989 | Murphy et al. | 164/45 |
| 5,119,882 | 6/1992 | Corbett | 164/45 |

*Primary Examiner*—P. Austin Bradley
*Assistant Examiner*—I.-H. Lin
*Attorney, Agent, or Firm*—Andrus, Sceales, Starke & Sawall

[57] ABSTRACT

A method of producing polymeric foam patterns for use in evaporable foam casting. A positive three-dimensional model of the metal part to be cast is made by a layered prototyping process in which layers of sheet material are bonded in superimposed relation and the contour of the part to be cast is cut into each layer as it is applied to preceding layers to provide the model. A metal, such as copper, is then deposited on the working surface of the model to provide a rigid self-supporting shell having a surface which is the negative image of the part to be cast. The shell, after separation from the model, is then mounted in a die casting mold with the negative surface bordering a die cavity. Beads of a polymeric material, such as polystyrene, are introduced into the die cavity and heated to fuse the beads and provide a foam pattern which is identical in configuration to the metal part to be ultimately cast.

11 Claims, No Drawings

METHOD OF PRODUCING POLYMERIC PATTERNS FOR USE IN EVAPORABLE FOAM CASTING

BACKGROUND OF THE INVENTION

Evaporable foam casting, or lost foam casting, is employed to cast metal parts, and has particular use in casting parts having a complex configuration. In the typical evaporable foam casting process, a polymeric foam pattern is formed having a contour identical to the part to be cast. The pattern is positioned in a molten flask and the space around the pattern, as well as any cavities in the pattern, are filled with an unbonded flowable material, such as sand. When the molten metal contacts the polymeric pattern, the pattern will vaporize and the vapor will be entrapped within the interstices of the sand, while the molten metal occupies the void created by vaporization of the foam. The result is a cast metal part that is identical in configuration to the foam pattern. The evaporable foam casting process also has an advantage in that it uses unbonded sand which is easily recyclable and is considered environmentally friendly.

In the typical process for producing the polymeric foam patterns, a pair of aluminum dies are mounted within a mold and define a die cavity. Beads of the polymeric material, such as polystyrene or polymethylmethacrylate, are fed into the die cavity in an air stream and are heated in the die cavity by an external steam chest to thereby expand and fuse the beads and provide the foam pattern.

When casting articles of complex configuration, such as the engine block of an internal combustion engine, the polymeric foam pattern may consist of several pattern sections which are glued together along parting lines to form the pattern. Each pattern section is separately produced using a pair of aluminum dies and the aluminum dies are formed by machining a billet of aluminum to provide the contoured working surface of the die. In addition, the outer surface of the die is also machined to achieve a substantially uniform thickness for the die to provide uniform heat transfer. Because of the extensive machining operations that are required, the time and cost for producing the dies is substantial.

Various types of layered rapid profiling have been used in the past to produce three-dimensional models or images. In a typical laminated object manufacturing (LOM) system, a paper sheet coated with a heat sensitive binder, such as wax, on its undersurface is fed to a working area, where a laser beam operated by a CAD program is utilized to cut a desired configuration or pattern in the sheet. In addition, certain portions of the sheet between the cut pattern and the margin of the sheet are cross-hatched by the laser beam to permit subsequently removal. A second sheet of the wax coated paper is then applied over the first sheet and bonded to the first sheet through the use of a heated roller. The laser beam is then operated to cut to the depth of one layer of the sheet material and create the desired pattern in the second sheet. This process is repeated until the desired thickness is obtained and after removal of the cross-hatched areas a three-dimensional model is obtained. Models of this type have been used primarily to facilitate visual analysis of objects of complex configuration.

SUMMARY OF THE INVENTION

The invention is directed to a method of producing polymeric foam patterns for use in evaporable foam or lost foam casting.

In accordance with the invention, one or more three-dimensional models, each representing a portion of the part to be cast, are initially formed by a layering process. In the layering process, superimposed layers of a material are applied to a supporting surface and each layer, after being bonded to previous layers, is shaped in accordance with a CAD program. The resulting three-dimensional layered model constitutes a positive image of a portion of the polymeric foam pattern to be produced.

After the models have been produced a layer of metal, preferably copper, is deposited on the working surface of each model by an electro-deposition process. As the model is normally composed of layers of a dielectric material, such as paper or resin, a thin coating of a metal, such as silver, can be applied to the working surface of the model by brushing or spraying, in order to deposit the copper layer on the surface by the electro-deposition process.

The models are maintained in the electro-deposition bath for a period of time sufficient to deposit a layer of copper having a thickness range of about 0.250 to 0.375 inch. The resulting copper shell is rigid and self-supporting and has a surface which is a negative image of a portion of the pattern to be produced.

After the plating operation, the copper shells are separated from the layered models and mounted in a mold in a manner such that the negative-image surfaces of the shells define a die cavity. Beads of a polymeric material, such as polystyrene or polymethylmethacrylate, are then fed into the die cavity through an air stream. The beads are heated in the die cavity, preferably by a steam jacket, which surrounds the copper dies, thus expanding and bonding the beads together to provide a polymeric foam pattern, which has a configuration identical to the metal part to be subsequently cast.

As each die is composed of a thin walled copper shell of uniform thickness, the cycle time for producing the foam patterns is substantially reduced, as compared to the cycle time when using machined aluminum dies, as in the past.

As a further advantage, the time for producing the dies is substantially reduced over the past practice, in which the dies were machined from aluminum billets. This is a particular benefit when casting complex configurations, such as an engine block for an internal combustion engine. The typical pattern for an engine block may be composed of several pattern sections bonded together by an adhesive along parting lines. Each pattern section is produced using separate tooling, each normally composed of a pair of cooperating die halves. Thus, a substantial number of dies are required to produce the complete pattern for an engine block. To produce the dies for an engine block by machining aluminum billets would, under normal practice, take at least several months, while the method of the invention can reduce the production time for the dies to several weeks.

The method of the invention also results in a substantial cost saving in the production of tooling, as opposed to the conventional machining process, as used in the past.

Other objects and advantages will appear in the course of the following description.

DESCRIPTION OF THE PREFERRED EMBODIMENT

The invention is directed to a method of producing polymeric foam patterns to be used in an evaporable foam or lost foam casting process. In accordance with the invention, a three-dimensional model, having a surface which is a positive image of the pattern, is initially formed by a layered profiling process. In the layering process, thin superimposed layers of a material are applied to a supporting base or substrate and each layer as it is applied, is shaped to a given configuration by a working member operated through a CAD program.

Various types of layering processes can be used to produce the model, such as a laminated object manufacturing (LOM) system, stereo lithography, selective laser sintering, fused deposition modeling, or solid ground curing.

In a typical LOM process, a sheet of material, such as paper, having a wax coating on the underside is positioned over a working surface and a laser beam operated through a CAD program and driven by an X-Y servo drive cuts a border or margin in the sheet and then cuts a contour or configuration of the pattern within the border. The laser beam then cross-hatches the area between the pattern and the margin. After laser cutting the first sheet, a second sheet is positioned in superimposed relation over the first sheet and is bonded to the first sheet through operation of a heated roller. The laser beam, again operating under the CAD program, and only to the depth of the second sheet, will cut the desired pattern in the second sheet. This process is repeated and in practice, hundreds and perhaps thousands, of sheets are bonded in superimposed relation and individually cut. After the layering has been completed, the cross-hatched areas are chiselled away to produce the three-dimensional model.

With a stereo lithographic process, a film of a light sensitive resin is applied to a base or substrate, and a low powered laser beam is moved over the liquid resin film in a CAD operated program to cure a portion of the resin in the desired shape of the pattern. Subsequent layers of liquid are applied over the cured layer and laser treated in the same manner to again produce a multi-layer, three-dimensional model.

A selective laser sintering process applies wax or plastic beads to a supporting surface and the beads are heated by a low powered laser beam in the desired CAD operated program to provide a fused area corresponding to the pattern contour. Again, after each fused layer is formed, a superimposed layer of beads is applied to the fused layer and subjected to the laser heating to produce a multiplicity of superimposed layers and provide the three-dimensional model.

In a fused deposition modeling method, a continuous bead or strip of plastic or wax is deposited by a gun which is driven by an X-Y servo drive controlled by the CAD program. The bead is heated as it is discharged from the gun, to provide a fused layer corresponding to the contour of the pattern. Superimposed layers are applied to each preceding layer in the same manner to provide the multi-layered three dimensional model.

The contoured working surface of the model is then coated, preferably by an electro-deposition process, with a metal, such as copper, nickel, silver, and the like to provide a rigid, self-supporting shell or die having a negative-image surface corresponding to the contoured working surface of the model. Copper is preferred as the metal, because it has a high coefficient of thermal conductivity and is relatively inexpensive.

As the model is formed of a dielectric material, such as paper or plastic, a thin flash coating of a metal, such as silver, can be initially applied to the working surface of the model by brushing or spraying. In the typical electro-deposition process, the model is immersed in an electrolyte bath and is made the cathode in an electrolytic circuit. The metal to be plated, such as copper, is made the anode in the circuit. The electrolyte can contain in solution one or more materials, such as a salt containing the metallic ion or radical of the metal to be plated, an additional salt to increase the conductivity of the bath, a material to prevent passivity of the anode, and/or a buffer to maintain the desired pH in the bath.

When plating with copper and using a copper anode, a typical acid plating bath can contain copper sulfate and sulfuric acid and is normally operated at room temperature.

Alternately, the electro-deposition process can include an inert anode, such as carbon, and the plated metal is obtained through a salt dissolved in the plating bath and containing the metallic ion or radical of the metal to be plated.

When a voltage is applied to the electrolytic circuit, copper will be deposited on the cathode model. In practice, a thickness of about 0.001 inch of copper will be deposited in a period of one hour. As it is desired that the deposited metal have a thickness in the range of about 0.250 to 0.375 inch, a period of several weeks may be required to achieve that thickness in the electro-deposition process.

The working surface of each model is normally bordered by a flat marginal area, and when the model is subjected to the electrolytic deposition, the working surface, as well as the marginal area will be plated with the metal. Other surfaces of the model, such as the surface opposite the working surface, can be masked to prevent deposition of the plating metal on those surfaces.

After the electro-deposition process has been completed, the model, with the adhering metal shell, is removed from the bath, and the shell is then separated from the layered model. As the shell has a substantial thickness in the range of about 0.250 to 0.375 inch, it is rigid and self-supporting.

A pair of copper shells are then mounted in a steamchest mold, with the negative-image working surfaces of the shells facing each other and defining a die cavity. When mounted in the steamchest, the flat marginal areas of the two shells are in contiguous flatwise relation and connected together by screws.

The cavity or working surface of one of the die shells is provided with an inlet feed opening through which the polymeric beads are fed into the die cavity during the die casting operation. In addition, the cavity surfaces of both shells are provided with core vents.

The procedure for casting the polymeric pattern in itself is conventional. Beads of the polymeric material, such as polystyrene, are fed into the die cavity through the feed opening in an air stream, and the air is vented from the die cavity through the core vents. After the die cavity is filled with the beads, steam is introduced into a steam chest or chamber which surrounds each of the copper die shells, and the steam can enter the die cavity through the core vents. The heat of the steam acts to expand and fuse the beads together to provide a porous foam-type pattern. After heating, cooling water is introduced into the surrounding steam chest to cool the pattern, and the pattern is then removed from the die cavity. The resulting pattern has a configuration identical to the metal part to be subsequently cast.

In the lost foam casting procedure, the foam pattern is placed in a molding flask and an unbonded, free-flowing material, such as sand, is introduced into the mold surrounding the pattern and filling any cavities within the pattern. When a molten metal is fed into the mold and contacts the pattern, the heat of the molten metal will vaporize the pattern and the vapor will be entrapped within the interstices of the sand, while the molten metal will occupy the void created by the vaporization of the pattern to produce a cast metal part having a configuration identical to that of the pattern.

As the dies to be used in producing the foam pattern, are in the form of thin walled copper shells having a uniform thickness, heat transfer during the die casting process of the pattern is substantially improved, with the result that the cycle time for producing the pattern is reduced. It has been found that the cycle time, using the dies as produced by the invention, is reduced to less than one-half of the cycle time required when using machined aluminum dies. This is an extremely important factor when dealing with high production items, such as components for internal combustion engines.

As a further advantage, the time required for producing the dies by the method of the invention is substantially reduced over the time required to produce machined aluminum dies, and the cost of producing the dies is less than one-half of the cost required for machining the aluminum dies.

Various modes of carrying out the invention are contemplated as being within the scope of the following claims particularly pointing out and distinctly claiming the subject matter which is regarded as the invention.

We claim:

1. A method of producing a polymeric foam pattern for use in a lost foam casting process, comprising the steps of producing a three-dimensional model composed of a plurality of superimposed bonded layers of a material and having a first surface conforming to a portion of the configuration of the pattern to be produced, applying a layer of a metal selected from the group consisting of copper, silver and nickel by electro-chemical deposition to said first surface to produce a rigid self-supporting metal shell having a second surface that is a negative image of said portion of the pattern, separating the shell from the model, assembling the shell as a die in a die assembly with said second surface bordering a die cavity, and introducing beads of a polymeric material into said die cavity to produce a polymeric foam pattern.

2. The method of claim 1, and including the step of heating said beads in the cavity to fuse the beads together and provide a porous polymeric foam pattern.

3. The method of claim 1, wherein said metal is copper and said method includes the step of applying a coating of silver to said first surface before depositing said layer of copper on said first surface.

4. The method of claim 1, wherein the step of producing a model comprises laying up a plurality of layers of material in superimposed relation to form a stack, bonding each layer as it is applied to preceding layers in the stack, and forming each layer to the configuration of the pattern before application of succeeding superimposed layers.

5. The method of claim 4, wherein said layers are paper sheets each having a heat sensitive binder on the undersurface thereof, and the step of bonding the layers comprises heating each sheet as it is applied to preceding sheets in the stack.

6. The method of claim 4, wherein the step of forming each layer comprises directing a CAD operated laser beam toward the layer in an X-Y path to provide the configuration of the pattern.

7. A method of producing a polymeric foam pattern for use in a lost foam casting process, comprising the steps of producing a pair of three-dimensional models each composed of a plurality of superimposed layers of dielectric material and each having a first surface that is a positive image of a portion of the pattern to be produced, electrochemically depositing copper on each first surface to provide a pair of rigid self-supporting copper shells each having a thickness of 0.250 to 0.375 inch and each having a second surface that is a negative image of a portion of the pattern, separating each shell from the corresponding model, assembling the shells in a die assembly with said second surfaces bordering a die cavity, feeding a plurality of beads of a polymeric material into the die cavity and heating said beads to produce a polymeric foam pattern.

8. The method of claim 7, and including the steps of applying a coating of silver to each first surface before depositing said layer of copper thereon.

9. The method of claim 7, wherein each model is produced by laying up a plurality of layers of material in superimposed relation to form a stack, bonding each layer as it is applied to preceding layers in the stack, and forming each layer to the configuration of the pattern before application of succeeding superimposed layers.

10. The method of claim 9, wherein said layers are sheets of dielectric material, and the step of forming each layer comprises the step of directing a CAD operated laser beam toward the layer in an X-Y path to cut the layer.

11. The method of claim 9, wherein the step of forming each layer comprises directing a laser beam toward the layer, and controlling penetration of said beam to a depth no greater than the thickness of said layer.

\* \* \* \* \*